(12) United States Patent
Moore

(10) Patent No.: US 7,401,570 B2
(45) Date of Patent: Jul. 22, 2008

(54) AIRCRAFT EXTREMITY MARKER

(76) Inventor: Michael Moore, 10966 9th Line, Markham, Ontario (CA) L6B 1A8

(*) Notice: Subject to any disclaimer, the term of this patent is extended or adjusted under 35 U.S.C. 154(b) by 180 days.

(21) Appl. No.: 11/488,656

(22) Filed: Jul. 19, 2006

(65) Prior Publication Data

US 2008/0017098 A1    Jan. 24, 2008

(51) Int. Cl.
*B60Q 9/00* (2006.01)
*B64D 45/00* (2006.01)

(52) U.S. Cl. .............. 116/32; 116/1; 116/203; 244/1 R

(58) Field of Classification Search ............. 116/1, 116/28 R, 28 A, 30, 32, 173, 203, 208, 209; 244/1 R, 4 A, 129.1, 117 R
See application file for complete search history.

(56) References Cited

U.S. PATENT DOCUMENTS

| 1,859,599 | A | * | 5/1932 | Quinn | 116/173 |
|---|---|---|---|---|---|
| 2,535,316 | A | * | 12/1950 | Larkin | 150/154 |
| 2,646,240 | A | * | 7/1953 | Anderson | 248/207 |
| 3,044,516 | A | * | 7/1962 | Stoll | 150/166 |
| 3,678,886 | A | * | 7/1972 | Tibbet | 116/173 |
| 3,788,268 | A | * | 1/1974 | Hiatt et al. | 116/28 R |
| 3,812,815 | A | * | 5/1974 | Kuenzel | 116/28 R |
| 4,167,862 | A | * | 9/1979 | Gould | 70/18 |
| 4,313,104 | A | * | 1/1982 | Phillips | 340/436 |
| 4,586,454 | A | * | 5/1986 | Hedquist et al. | 116/28 R |
| 4,606,516 | A | * | 8/1986 | Willison | 244/121 |
| 5,127,265 | A | * | 7/1992 | Williamson et al. | 73/182 |
| 5,161,769 | A | * | 11/1992 | Coulthard | 248/599 |
| 5,340,055 | A | * | 8/1994 | Rodyniuk et al. | 244/1 R |
| 5,611,501 | A | * | 3/1997 | Crandley | 244/1 R |
| 5,685,255 | A | * | 11/1997 | Arzu | 116/30 |
| RE35,831 | E | * | 6/1998 | Wright et al. | 244/1 R |
| 6,749,151 | B1 | * | 6/2004 | Ross | 244/1 R |
| 6,945,191 | B2 | * | 9/2005 | Collopy | 116/28 R |

* cited by examiner

*Primary Examiner*—R. A. Smith
*Assistant Examiner*—Amy Cohen Johnson
(74) *Attorney, Agent, or Firm*—Bereskin & Parr

(57) ABSTRACT

A marker for the wingtip or other extremity of an aircraft. The marker includes a fabric pouch having a flap containing hook and loop fasteners, to hold the pouch on the aircraft extremity. A fabric tube extends outwardly and substantially horizontally from the pouch and supports a marker flag at its tip. The fabric tube contains a breakable support rod, so that if the aircraft wingtip collides with an object, the support rod will break and the flag will droop, providing a visible indication that a collision has occurred. The broken rod can then be replaced.

10 Claims, 9 Drawing Sheets

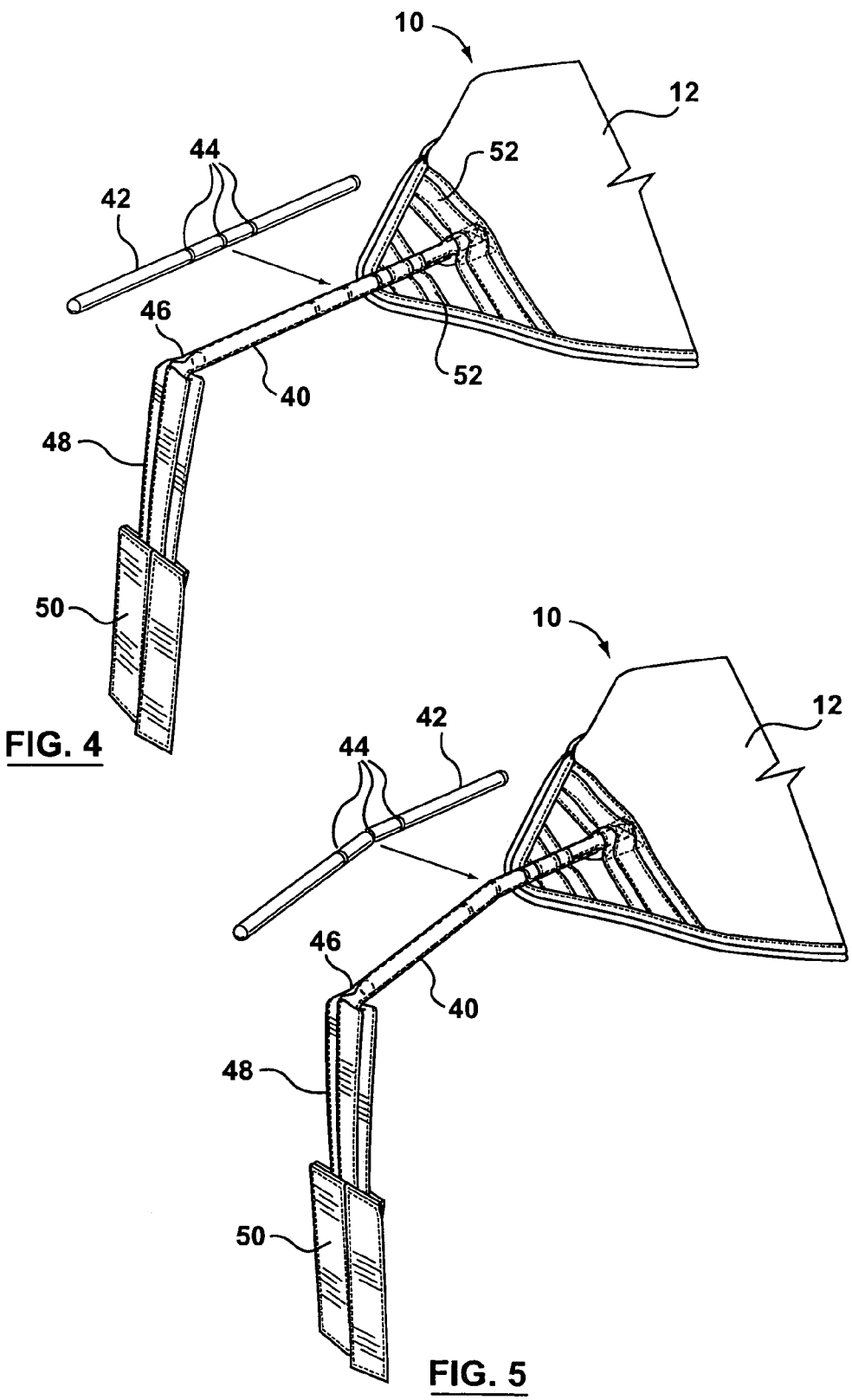

AIRCRAFT EXTREMITY MARKER

FIELD OF THE INVENTION

This invention relates to an improved marker for making an aircraft extremity (such as a wingtip) more visible and for providing a visible indication if a collision has occurred between the aircraft extremity and another object.

BACKGROUND OF THE INVENTION

Aircraft, while parked, or when taxiing or being towed from one ground location to another, are subject to having their extremities, such as wingtips, collide with another object. Even in small private aircraft, the wings are long and the person moving the aircraft is not normally close to the wingtips, nor to the elevators or rudder, so it is difficult to judge their locations. It is therefore all too common to have collisions between the extremities of one aircraft and those of another on the ground. It is also common to have collisions for example between aircraft wingtips and the edges of hanger door openings or other objects in the hanger. The damage caused by these collisions is not always evident, but it is usually costly to repair and can render the aircraft non-airworthy.

Various attempts have been made to develop systems to avoid these collisions. For example, U.S. Pat. No. 6,963,293 to Rodger Rast shows an illumination system to reduce the number of collisions. Unfortunately, the system is complex and expensive.

U.S. Pat. No. 6,118,401 to Bruce Tognazzini shows another system in which detecting devices such as a radar or a video camera are mounted in the wingtips. Again, this is complex and expensive.

BRIEF SUMMARY OF THE INVENTION

An object of the invention is to provide a marker for an aircraft extremity, such as a wingtip, to make the aircraft extremity more visible so that a person moving the aircraft, and which person is located at some distance from the wingtip in question, will more easily be able to see the wingtip and whether or not it is close to another object.

A further and important feature of the invention is that it provides a lasting and visible record or indication if a collision has occurred.

In one of its aspects the invention provides a marker for an aircraft extremity, said marker comprising:

a) A flexible portion for attachment to said extremity, said flexible portion including a retainer for holding said flexible portion on said extremity, b) An elongated support member having at least one weakened portion therein, c) A flexible holder enclosing said support member and attached to said flexible portion in a position extending from said extremity with a substantial horizontal component when said flexible portion is held on said extremity, said holder having an end remote from said extremity, d) A flag connected to said end of said flexible holder, e) Said weakened portion being dimensioned to break if said support member collides with another object, thus creating a broken support member, said broken support member being retained by said holder and drooping to act as a visible record that a collision has occurred.

Further objects and advantages of the invention will appear from the following description and drawings.

BRIEF DESCRIPTION OF THE DRAWINGS

In the drawings:

FIG. 4 is a perspective view of the marker of FIGS. 1 to 3 and showing details of a collision marking part;

FIG. 5 is a perspective view similar to that of FIG. 4 but showing the collision marking part broken;

DETAILED DESCRIPTION OF PREFERRED EMBODIMENT

Figure 1:
FIG. 1 is a diagrammatic view of an aircraft having on its wingtip a marker according to the invention.
Figure 2:
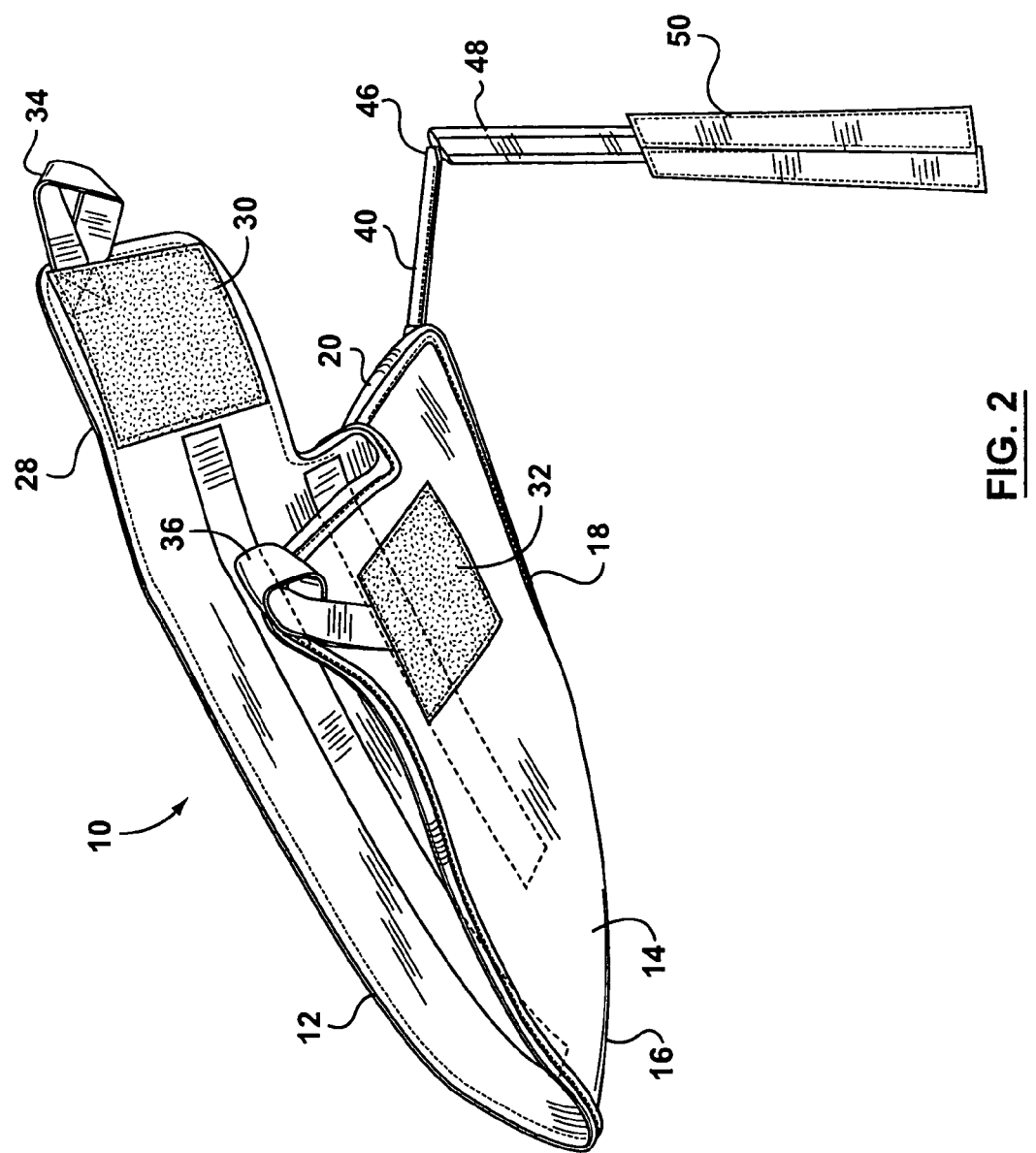
FIG. 2 is a perspective view of a wing marker according to the invention, as seen from below, and with a fastening flap in an open position.
Figure 3:
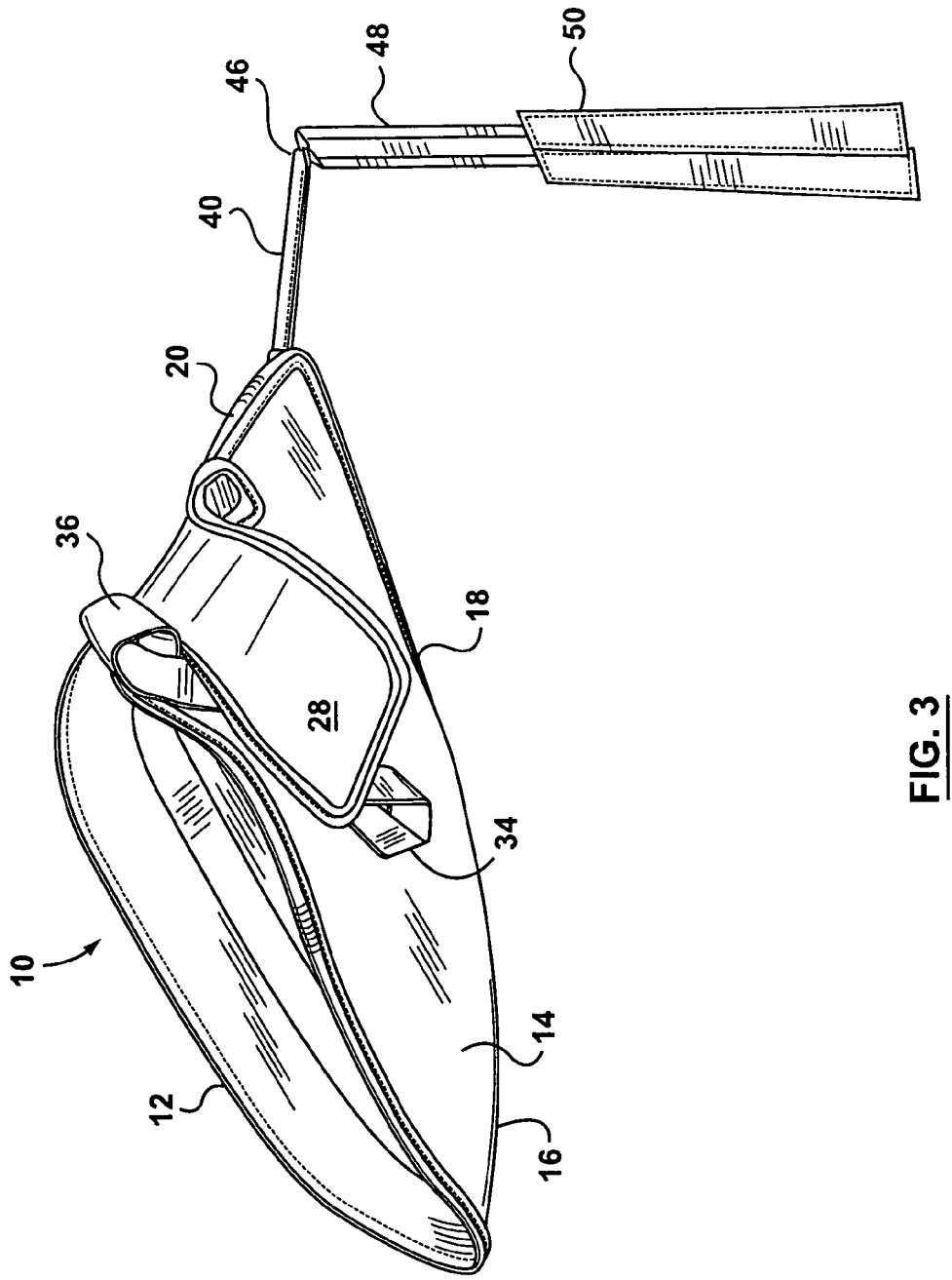
FIG. 3 is a view similar to FIG. 2 but with the fastening flap of the marker in closed position.
Figure 6:
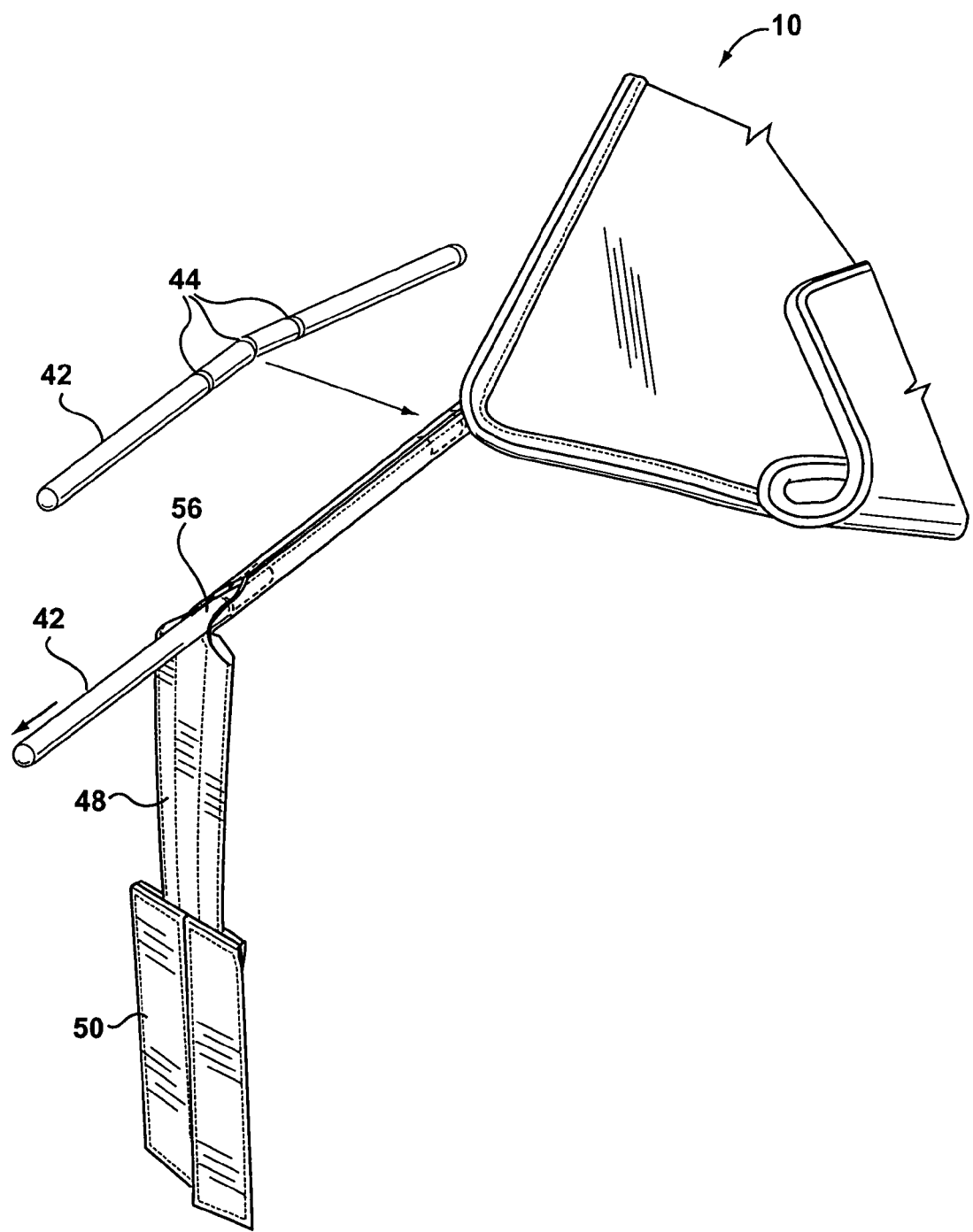
FIG. 6 is a perspective view similar to that of FIG. 5 but showing a portion of the collision marking part being removed.

Reference is first made to FIGS. 1 to 6, which show a preferred embodiment of the invention. As shown, there is provided a wingtip marker 10, typically formed from a woven solution dyed, acrylic fiber or ballistic nylon with a polyurethane coating. (Other suitable materials may also be used.) The marker 10 includes an upper layer 12 and a lower layer 14 sewn together along three edges 16, 18, 20 to form a type of pouch or open-ended envelope adapted to slide onto the wingtip 24 of an aircraft 26. The marker 10 includes a flap 28 extending from one edge thereof, as best shown in FIG. 2. The inside or lower surface of the flap 28 is covered with a patch 30 of a hook and loop fastener (such as that sold under the trade-mark VELCRO) attached thereto (by sewing or by adhesive or both). After the marker 10 is pulled tightly onto an aircraft wingtip, the flap 28 is folded over a complementary hook and loop fastener patch 32 fastened to the lower surface of the lower layer 14. The patch 30 is then pressed against the patch 32 to retain the marker 10 on the aircraft wingtip.

To facilitate the process of placing the marker 10 on the wingtip 24, a first tab 34 is connected to the outer end of the flap 28, and a second tab 36 is connected to the outside edge of the lower layer 14, adjacent the patch 32. The tabs 34, 36 are typically simply fabric loops sewn to the flap 28 and to the lower layer 14. The loops 34, 36 can be grasped by a user to help the user to install the marker 10 tightly onto the aircraft wingtip 24.

To provide increased friction between the marker 10 and the aircraft wingtip or other extremity, any suitable high friction material can be used for or applied to the inside surfaces of the markers 12, 14 (or 76, 90 as described later). For example, the high friction material may be rubber, silicone or urethane.

The outer surfaces of the marker 10 are preferably of a bright color, so that they will be readily visible to a person moving the aircraft, or who is moving another aircraft past the marked aircraft. The color can be any bright yellow, red, orange, green, blue or other suitable color.

As shown in the drawings, a fabric tube 40 is securely fastened to the upper layer 12 of the marker 10 and projects outwardly from an edge of the marker 10. Preferably, the fabric tube 40 projects horizontally from a rear corner of the marker 10. Located within the tube 40 is a support rod 42, preferably made of a plastic material. The function of the support rod 42 is to provide mechanical support so that the tube 40 will extend outwardly horizontally, or with a substantial horizontal component, and will not droop. However, the support rod 42 includes several encircling grooves 44 near its center, which weaken it so that if it is impacted by another object, it will relatively easily break.

Attached to the free end 46 of the tube 40 is another strip of fabric 48 having a flag 50 attached thereto. The flag 50 is simply a brightly colored fabric piece which helps to mark more visibly the location of the aircraft wingtip. The flag 50 can be two-dimensional, or can alternatively be three-dimensional which can increase the flag's visibility. The flag 50 and strip 48 hang down from the end of tube 40.

As best shown in FIGS. 4 and 5, the fabric tube 40 is secured to the upper surface of the upper layer 12 by several fabric strips 52 extending across the fabric tube 40 at right angles thereto. The strips 52 are sewn to the upper layer 12 and to the fabric tube 40 to ensure that the fabric tube 40 will not droop downwardly under normal circumstances. Instead, fabric tube 40 will normally extend horizontally outwardly, or at least will have a substantial horizontal component, as best shown in FIG. 4.

If, while the aircraft on which the marker 10 is located is being moved, its wingtip 24 collides with another object, or if another aircraft is moved past the marked aircraft and collides with the marked wingtip, then the support rod 42 will fracture at one of the weakened locations 44. The fabric tube 40 will then droop downwardly, as shown in FIG. 5. This provides an immediately visible and lasting indication that a collision has occurred and that there may be damage to the aircraft which needs to be repaired.

If the support rod 42 is broken, then it can be removed from the fabric tube 40 through a small hole 56 (FIG. 6) in the fabric tube 40. The hole 56 is preferably dimensioned so that the support rod 42 must be pushed through the hole with some force, so that in normal use, the support rod 42 will not fall out of the fabric tube 40. A new and unbroken support rod 42 can then be inserted in the fabric tube 40 to replace the broken rod.

Preferably the support rod 42 is of circular cross section, so that it does not need any special orientation within the fabric tube 40.

Figure 7:
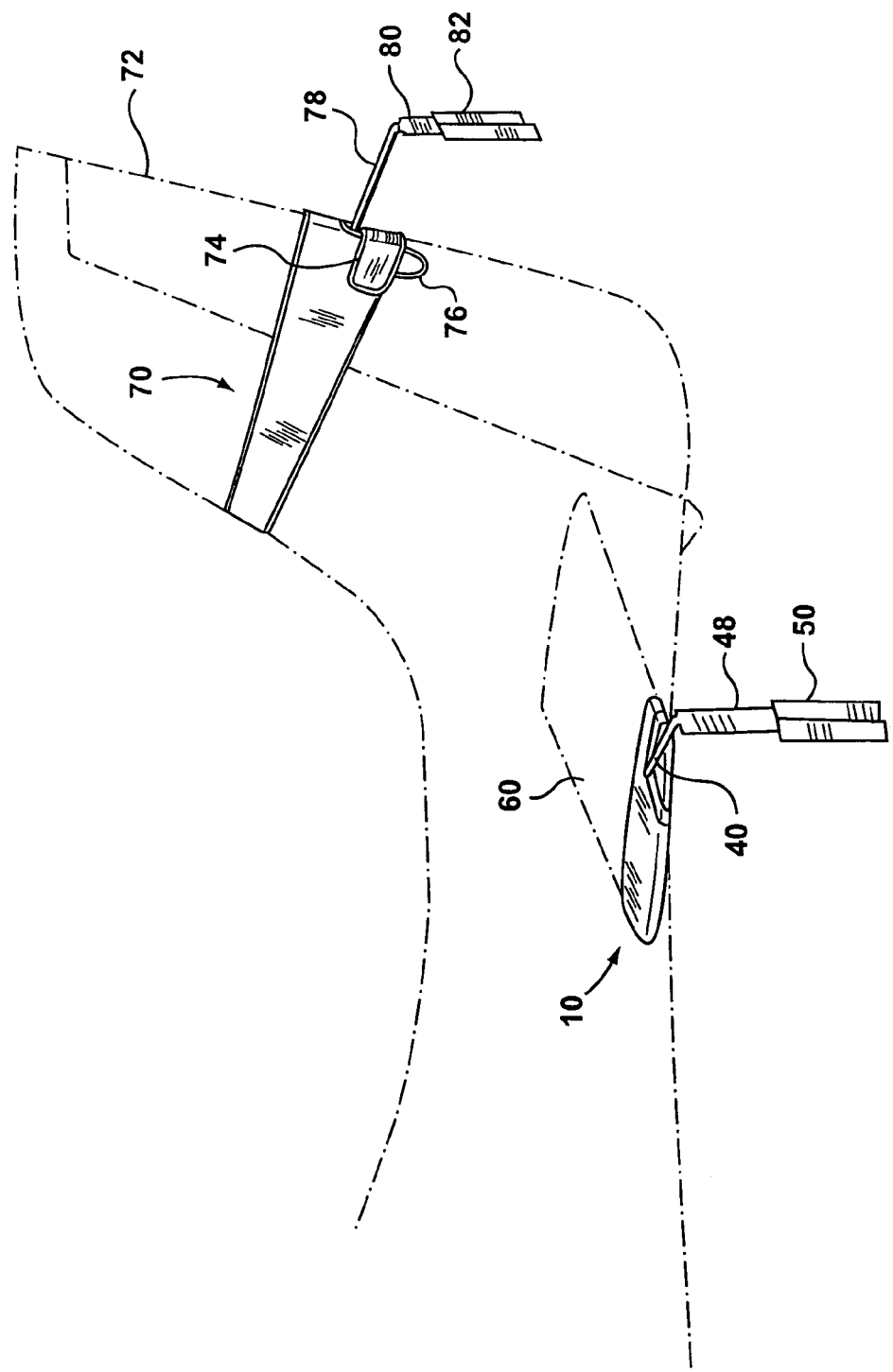
FIG. 7 is a diagrammatic view showing the device of the invention as applied to an aircraft rudder and to an aircraft elevator.

While the marker 10 has been shown as applied to an aircraft wingtip, it can as shown in FIG. 7 be applied to the tip of an aircraft elevator (tail wing) 60. The shape of the pouch formed by the marker 10 will of course be made to fit the end of the elevator, and as before, the fabric tube 40 extends substantially horizontally, preferably rearwardly and outwardly from the tip of the elevator 60.

As also shown in FIG. 7, a marker 70 similar to that described may be used to mark the rear edge of the rudder (tail) 72 of the aircraft. The rudder marker 70 is preferably formed as a strip of fabric which may be wrapped around the rudder, with a flap 74 (corresponding to the flap 28) which has a patch of hook and loop fasteners on its inner surface. The flap 74 is located at one end of the strip of fabric forming the marker and may be pulled over a corresponding fastener patch (not shown) containing mating hook and loop fasteners, to hold the marker 70 on the aircraft rudder. A fabric loop or tab 76 may be attached to the flap 74 to serve as a grip to pull the flap 74 tightly over the hook and loop patch (not shown) beneath the flap 74.

A fabric tube 78 is attached to the rudder marker 70 in any desired manner so that the tube 70 projects rearwardly and at least partially horizontally from the rear edge of the rudder 72. The tube 78 includes a support rod (not shown in FIG. 7) therein, exactly like rod 42, and which may be inserted or removed through a hole in tube 78. A fabric strip 80 and flag 82 which are exactly like strip 48 and flag 50, are attached to the end of fabric tube 78, to mark the rear end of the aircraft.

As before, if a tip of the aircraft elevator 60 or rear edge of rudder 72 collides with an object, or if an object collides with them, the support rod in tube 56 or tube 78 will break at its weakened portion, and the tube 56 or 78 will then droop downwardly at a steeper angle and will appear bent, thus indicating that a collision has occurred. The support rod may then be withdrawn through the hole as previously described for tube 40 and may be replaced by a new and unbroken support rod.

Figure 8:
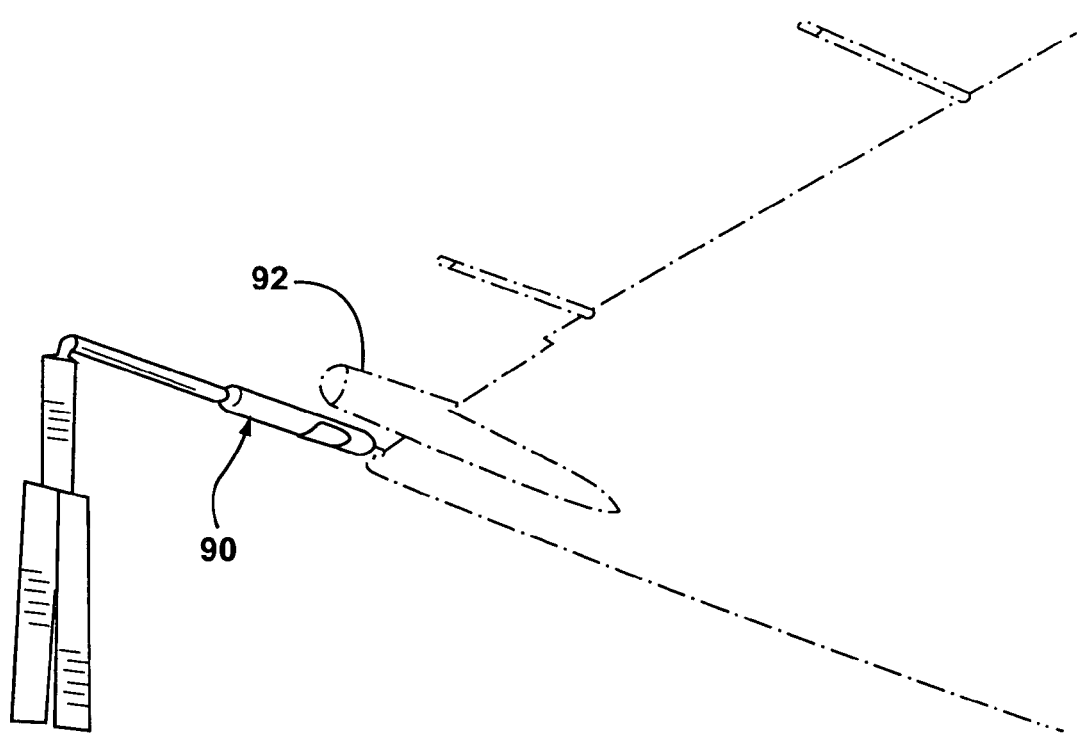
FIG. 8 is a diagrammatic view showing a device according to the invention applied to an aircraft static wick.
Figure 9:
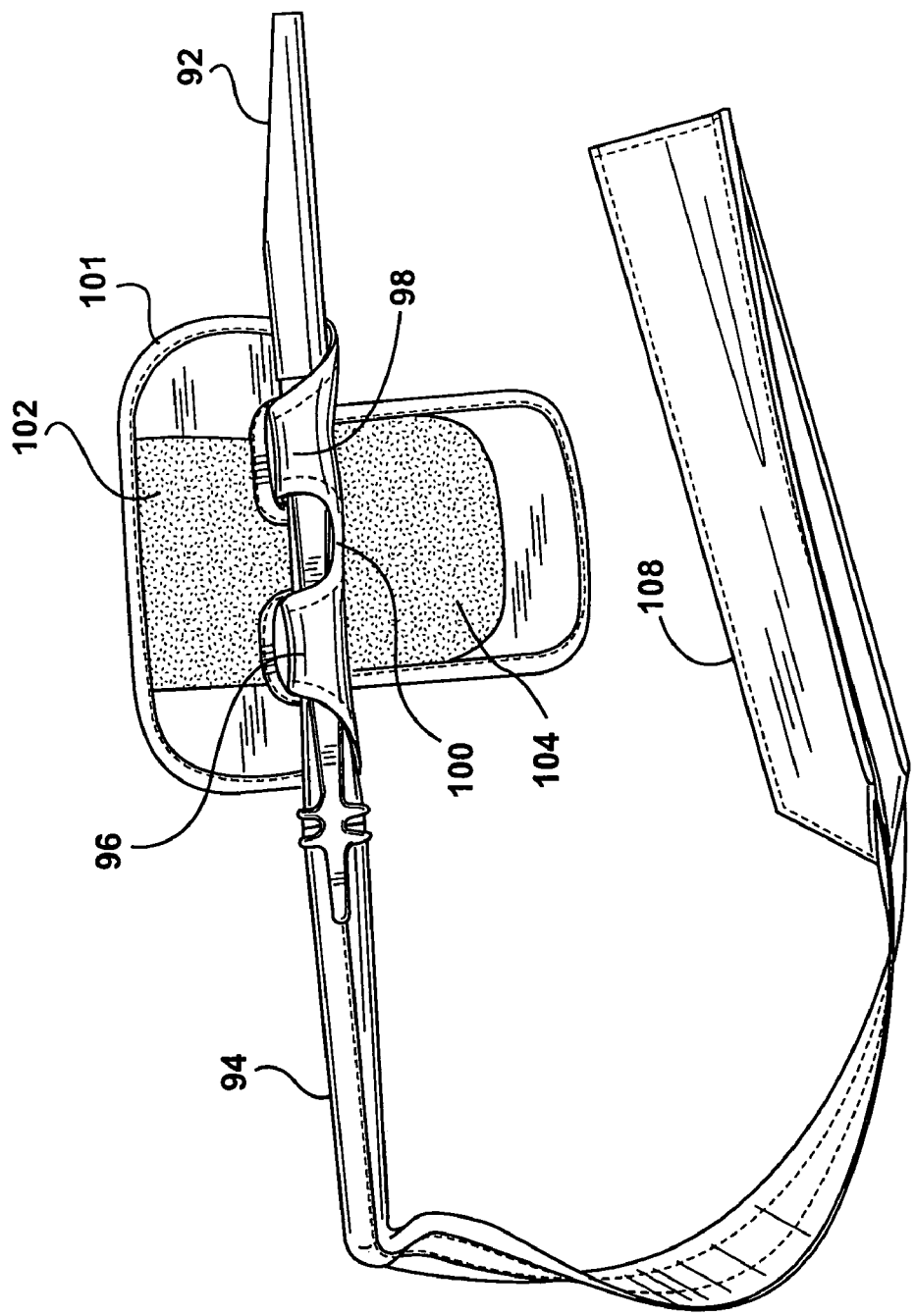
FIG. 9 is a perspective view of the embodiment of FIG. 8, in open condition.
Figure 10:
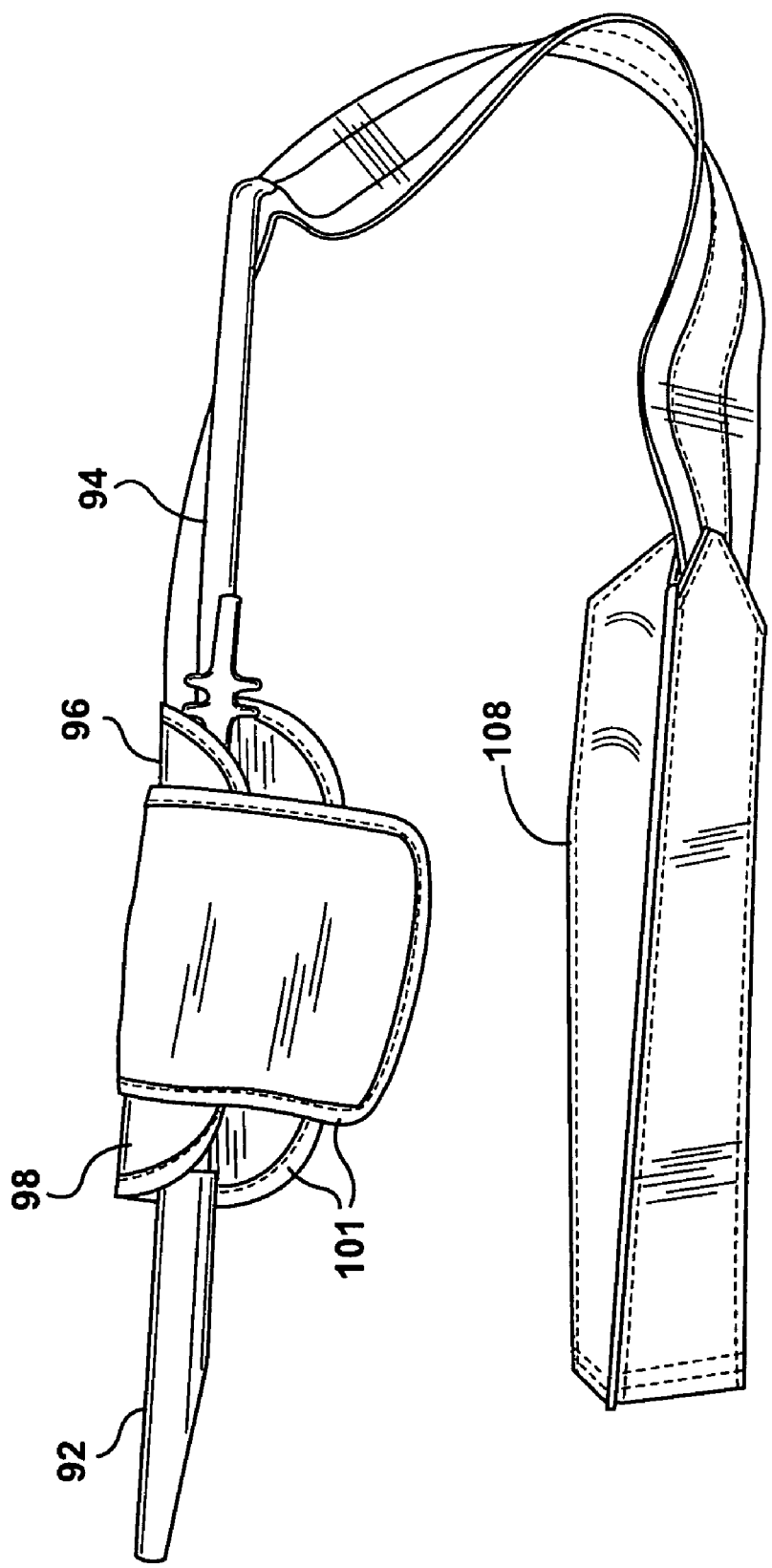
FIG. 10 is a perspective view of the embodiment of FIG. 8, in closed condition.

FIGS. 8 to 10 show a marker 90 wrapped around a static wick 92 (also sometimes called a static discharger) on the rear edge of an aircraft wing near the wingtip. The marker 90 includes a fabric tube 94, like tube 40 and containing a support rod having a weakened portion (not shown) like rod 42, and having a hole (not shown) for insertion and removal of the support rods. The tube 94 is preferably of a high friction material. Two inner flaps 96, 98, joined by a fabric bridge 100, are sewn to the tube 94 near one end thereof and can be wrapped around the static wick and held tightly thereon by an outer flap 101 sewn to the inner flaps 96, 98. The outer flap 101 has two cooperating patches 102, 104 of hook and loop fasteners which can be pressed together as shown in FIG. 10 to hold the tube 94 on the static wick 92.

A fabric strip 106 is connected to the end of tube 94 and supports a flag 108, like flag 50, to mark the static wick. As before, if a collision occurs which breaks the support rod in the fabric tube 94, then the fabric tube 94 will again droop to provide a visible indication that a collision has occurred.

It will be appreciated that various changes may be made in the embodiments described. For example, the materials used in the marker 10, and the shape of the marker 10, may be changed as appropriate. The support rods need not be of circular cross section and can have alternative weakened portions, so long as they extend outwardly from the aircraft extremity being marked and have in their normal state a substantial horizontal component to their extension, and so long as when they break, the tube holding them will then droop to provide a visible indication that the support rod has broken. For this purpose the weakened portion of the support rod should be between the middle and the inner end of the support rod, and should not be near the outer end of the support rod.

In addition, the fabric tube 40 need not be a tube but can have many other configurations, and the support rod 42 can be extractable from the tube 40 in any desired way.

The invention claimed is:

1. A marker for an aircraft extremity, said marker comprising:
   a) A flexible portion for attachment to said extremity, said flexible portion including a retainer for holding said flexible portion on said extremity,
   b) An elongated support member having at least one weakened portion therein,
   c) A flexible holder enclosing said support member and attached to said flexible portion in a position extending from said extremity with a substantial horizontal component when said flexible portion is held on said extremity, said holder having an end remote from said extremity, d) A flag connected to said end of said flexible holder, e) Said weakened portion being dimensioned to break if said support member collides with another object, thus creating a broken support member, said broken support member being retained by said holder and drooping to act as a visible record that a collision has occurred.

2. A marker according to claim 1 wherein said support member is a plastic rod.

3. A marker according to claim 2 wherein said flexible holder has an opening therein through which said broken support member may be extracted and through which a new support member may be inserted.

4. A marker according to claim 3 and being shaped to fit on the tip of a wing or elevator of said aircraft, said marker including a flap adapted to be pulled over a mating area of said flexible portion to pull said flexible portion tight on said extremity, said retainer comprising two mating sets of hook and loop fasteners, one set being mounted on said flap and the other set being mounted on said mating area of said flexible portion.

5. A marker according to claim 1 wherein said aircraft extremity is a wingtip.

6. A marker according to claim 1 wherein said aircraft extremity is a rear edge of an aircraft rudder, said flexible portion being a fabric strip adapted to be wrapped around said rudder, in a position with said elongated support member extending rearwardly from said rudder and having a substantial horizontal component.

7. A marker according to claim 1 wherein said aircraft extremity is a static wick and wherein said flexible portion comprises a fabric marker adapted to wrap around said static wick.

8. A marker according to claim 1 wherein said flexible portion and said flexible holder both comprise fabric.

9. A marker according to claim 8 wherein said flag comprises fabric.

10. A marker according to claim 8 wherein said flexible holder is sewn to said flexible portion.

* * * * *